L. H. ALLEN.
MOTOR CYCLE.
APPLICATION FILED JULY 14, 1909.
962,289.
Patented June 21, 1910.
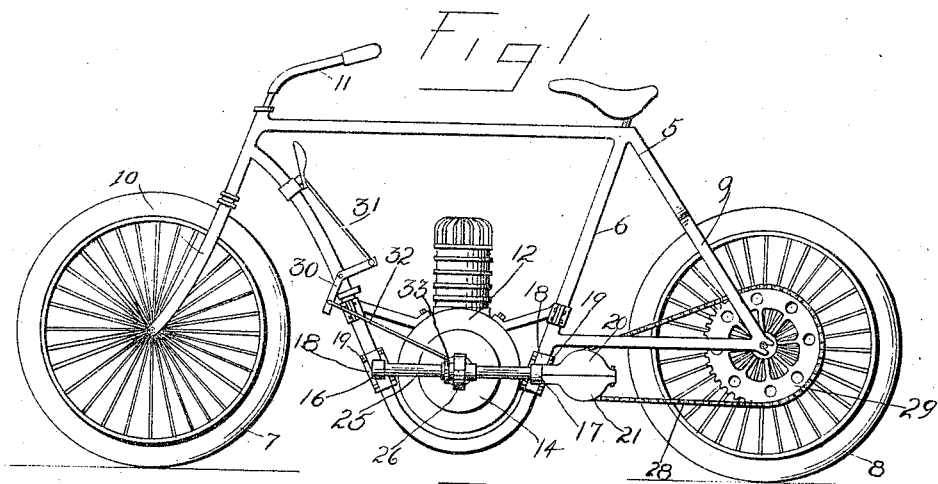
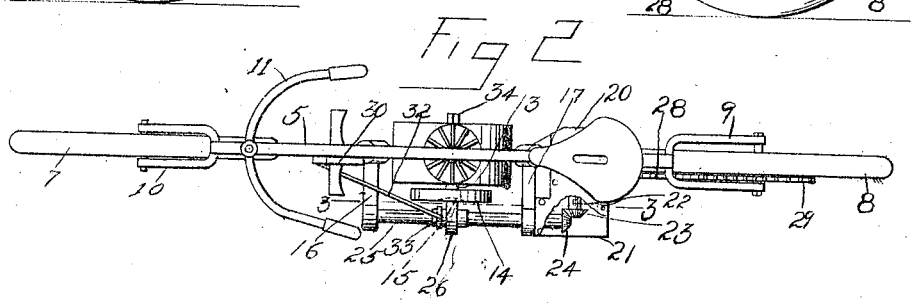
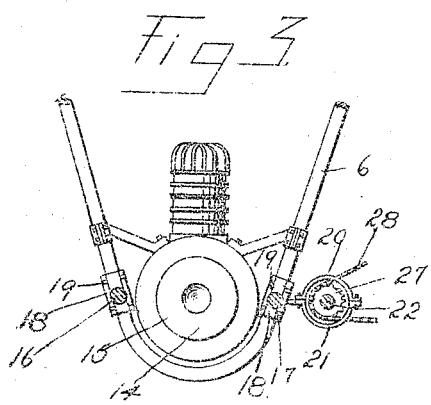
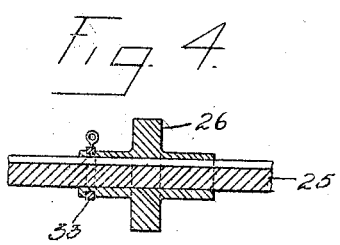
Inventor
LUTHER H. ALLEN.
Witnesses
By
Attorneys

UNITED STATES PATENT OFFICE.

LUTHER H. ALLEN, OF GRAVETTE, ARKANSAS.

MOTOR-CYCLE.

962,289.

Specification of Letters Patent.   Patented June 21, 1910.

Application filed July 14, 1909. Serial No. 507,534.

*To all whom it may concern:*

Be it known that I, LUTHER H. ALLEN, a citizen of the United States, residing at Gravette, in the county of Benton, State of Arkansas, have invented certain new and useful Improvements in Motor-Cycles; and I do hereby declare the following to be a full, clear, and exact description of the invention, such as will enable others skilled in the art to which it appertains to make and use the same.

The invention relates to a motor cycle and more particularly to the class of motor attachments for bicycles.

The primary object of the invention is the provision of a motor attachment of this character in which a bicycle of the ordinary construction may be propelled thereby and that will enable the speed of said bicycle to be increased or decreased at the will of a rider.

Another object of the invention is the provision of a motor cycle in which the driving wheel thereof is operated through the medium of friction gears so that speed of travel of the cycle may be increased or decreased at will by a rider and furthermore doing away with the necessity of pedaling the cycle for starting the motor as the latter is started by hand cranking the same.

A further object of the invention is the provision of a motor cycle in which the motor thereof is capable of being readily detached from the frame of the cycle and attached thereto thus making it possible to mount the motor and its driving gearing on the frame of an ordinary bicycle.

A still further object of the invention is the provision of a motor cycle which is simple in construction, reliable and efficient in operation and inexpensive in the manufacture.

With these and other objects in view, the invention consists in the construction, combination and arrangement of parts as will be hereinafter more fully described, illustrated in the accompanying drawings, which disclose the preferred form of embodiment of the invention, and as pointed out in the claim hereunto appended.

In the drawings:—Figure 1 is a side elevation of a motor cycle constructed in accordance with the invention. Fig. 2 is a top plan view thereof. Fig. 3 is a sectional view on the line 3—3 of Fig. 2. Fig. 4 is a fragmentary sectional view through the shiftable friction disk and its supporting shaft.

Similar reference characters indicate corresponding parts throughout the several views in the drawings.

In the drawings the numeral 5 designates generally a bicycle having the usual main frame 6, the same being supported by front and rear wheels 7 and 8, the latter forming the driving wheel and being mounted between rear forks 9, of the main frame. The front wheel 7, is mounted in the front fork 10, which latter has connection with suitable steering handle bars 11, for guiding the front wheel and steering the bicycle in its travel.

Suitably mounted in the lower portion of the main frame is a motor or engine 12, the driving shaft 13 of which has fixed thereto a friction disk 14, the latter containing a centrally located depression 15, the purpose of which will be hereinafter more fully described. Projecting from one side of the main frame 6 of the bicycle are front and rear supporting brackets 16 and 17, each of which are provided with split collars 18, connected about the tubing of the main frame 6, by fasteners 19, so that said brackets may be readily attached to and detached from the frame of the bicycle. The rear bracket supports a substantially L-shaped shaft casing formed of separable upper and lower sections 20 and 21 suitably connected and within this casing is supported a short rotatable shaft 22, the latter having fixed at one end a beveled pinion 23, enmeshing with a pinion 24, fixed to the end of a driven shaft 25, the latter journaled in the casing and the front bracket in spaced relation to the friction disk 14 of the motor.

The driven shaft 25, has slidably keyed thereto a friction disk 26, which contacts with the friction disk 14, to impart rotary movement to the shaft 25, for driving the rear wheel 8 of the bicycle in the manner as will be hereinafter described.

Secured to the shaft 22, is a sprocket wheel 27, over which is trained a sprocket chain 28, the latter also trained over a sprocket wheel 29 fixed to the hub of the rear wheel and through the medium of this sprocket chain 28, the said rear wheel 8, of the bicycle is driven by the motor.

Pivoted to the main frame is a bell crank lever 30, to which latter is connected an operating rod 31, and also connected to the bell crank lever 30 is a link 32 the latter being connected to a collar 33, working in an annular groove contained in a hub of the friction disk 26, and by manipulation of the operating rod 31 the said friction disk 26, may be shifted longitudinally on the shaft 25 so as to change the point of contact of the said friction disk with the friction disk 14, thereby varying the speed of travel of the bicycle.

In operation the motor engine 12 is started by first turning the projecting end 34, of the driving shaft 13, with a crank. This causes the friction disk 14, to rotate which imparts its rotary motion to the friction disk 26, slidably keyed to the shaft 25, thereby rotating the same and this shaft transmits its motion to the shaft 22, and through the medium of the sprocket chain 28, the rear wheel 8, of the bicycle. The speed of the bicycle depends upon the contact of the friction disk 26, with the outer face of the friction disk 14, the speed being greatest near the periphery and gradually decreasing as the friction disk 26, is moved toward the recessed center 15 of said disk 14. When this point is reached and the friction disk 26, passes out of contact with the friction disk 14, the motor engine ceases to impart motion to the rear driving wheel 8 of the bicycle.

It is obvious that the motor and the friction drive gearing may be readily and easily mounted upon the main frame of any style of bicycle, although the form shown and described herein is deemed the preferable type.

It is to be understood of course that minor changes, variations and modifications may be made, in the construction such as come properly within the scope of the appended claim without departing from the spirit or sacrificing any of the advantages of the invention.

What is claimed is:—

The combination with a wheeled bicycle frame, of brackets detachably connected to the frame, a split casing formed on one of said brackets; a shaft rotatably mounted in said casing, a second shaft journaled in one bracket and said casing, enmeshing pinions connecting the shafts, a friction disk slidably keyed upon the second named shaft, a motor mounted in the bicycle frame and having a driving shaft, a friction disk fixed to said driving shaft and contacting with the first named friction disk, driven connections between the first named shaft and the rear supporting wheel of the bicycle frame, and means for changing the position of the first named disk with respect to the other.

In testimony whereof, I affix my signature, in presence of two witnesses.

LUTHER H. ALLEN.

Witnesses:
G. W. DUNBAR,
D. T. ROSEBORO.